(12) United States Patent
Beaujuge et al.

(10) Patent No.: US 8,404,800 B2
(45) Date of Patent: Mar. 26, 2013

(54) BLACK SOLUBLE CONJUGATED POLYMERS WITH HIGHLY TRANSMISSIVE OXIDIZED STATE

(75) Inventors: Pierre Marc Beaujuge, Berkeley, CA (US); John J. Reynolds, Gainesville, FL (US); Stefan Martin Ellinger, Visp (CH)

(73) Assignee: University of Florida Research Foundation, Inc., Gainesville, FL (US)

( * ) Notice: Subject to any disclaimer, the term of this patent is extended or adjusted under 35 U.S.C. 154(b) by 5 days.

(21) Appl. No.: 12/922,908

(22) PCT Filed: Oct. 29, 2008

(86) PCT No.: PCT/US2008/081606
§ 371 (c)(1),
(2), (4) Date: Oct. 28, 2010

(87) PCT Pub. No.: WO2009/117025
PCT Pub. Date: Sep. 24, 2009

(65) Prior Publication Data
US 2011/0046330 A1 Feb. 24, 2011

Related U.S. Application Data

(60) Provisional application No. 61/070,102, filed on Mar. 19, 2008.

(51) Int. Cl.
*C08G 75/32* (2006.01)
(52) U.S. Cl. .................................. 528/380; 528/377
(58) Field of Classification Search .............. 528/377, 528/380
See application file for complete search history.

(56) References Cited

U.S. PATENT DOCUMENTS

| 6,756,473 | B2* | 6/2004 | Reuter et al. | 528/377 |
|---|---|---|---|---|
| 6,791,738 | B2 | 9/2004 | Reynolds et al. | |
| 7,208,122 | B2 | 4/2007 | Swager et al. | |
| 7,605,225 | B2* | 10/2009 | Marks et al. | 528/377 |
| 7,951,901 | B2* | 5/2011 | Reuter et al. | 528/380 |
| 8,324,400 | B2* | 12/2012 | Toppare et al. | 548/257 |
| 2011/0023934 | A1* | 2/2011 | Xue et al. | 136/245 |

FOREIGN PATENT DOCUMENTS

| EP | 0698605 A1 | 2/1996 |
|---|---|---|
| WO | WO-2007-087587 | 8/2007 |

OTHER PUBLICATIONS

Colladet (Low Band Gap Donor-Acceptor Conjugated Polymers toward Organic Solar Cells Application. Macromolecules 2007, 40, pp. 65-72).*
Beaujuge (The donor-acceptor approach allows a black-to-transmissive switching polymeric electrochrome, Nature Materials, Oct. 2008, 7, 795-799).*

(Continued)

*Primary Examiner* — Ling Choi
*Assistant Examiner* — Brieann R Fink
(74) *Attorney, Agent, or Firm* — Saliwanchik, Lloyd & Eisenschenk (57) ABSTRACT

A soluble donor-acceptor electrochromic polymer (DA-ECP) is prepared that absorbs light throughout at least the majority of the visible range and is essentially black to the human eye when in the neutral state, but is highly transmissive when electrochemically doped. The conjugated polymer has acceptor units separated by sequences of a plurality of donor units. The sequences can be monodispersed or polydispersed. The DA-ECP is prepared by the polycondensation of a plurality of at least one donor-acceptor oligomer (DA-oligomer) that has at least one internal acceptor repeating unit and at least one donor repeating unit on all termini of the oligomer, and optionally, a plurality of at least one donor monomer and/or donor oligomer.

17 Claims, 9 Drawing Sheets

R = 2-EthylHexyl
m=1, P9

OTHER PUBLICATIONS

Park (Synthesis and Characterization of Fluorene-Based Low-Band Gap Copolymers Containing Propylenedioxythiophene and Benzothiadiazole Derivatives for Bulk Heterojunction and Photovoltaic Cell Applications. Journal of Polymer Science: Part A: Polymer Chemistry. May 2008, 46, 6175-6184).*

Argun (Multicolored Electrochromism in Polymers: Structures and Devices, Chem. Mater. 2004, 16, 4401-4412).*

Grenier (CAPlus Abstract of Processable dioxythiophene based polymers with branched substituents, Polymer Preprints (American Chemical Society, Division of Polymer Chemistry), 2004, 45(1), 262).*

Kiran (Z-scan and degenerate four wave mixing studies on newly synthesized copolymers containing alternating substituted thiophene and 1,3,4-oxadiazole units. J. Phys. B: At. Mol. Opt. Phys. 39 (2006) 3747-3756).*

Reeves (Spray Coatable Electrochromic Dioxythiophene Polymers with High Coloration Efficiencies. Macromolecules. 2004, 37, 7559-7569).*

Colladet (Low Band Gap Donor-Acceptor Conjugated Polymers toward Organic Solar Cells Applications. Macromolecules. 2007, 40, 65-72).*

Reynolds (Conjugated Polymers: Theory, Synthesis, Properties, and Characterization. Chapter 20: Electrochromism of Conjugated Polymers. CRC Press. 2007, 64 pages).*

Wienk (Low band gap polymer bulk heterojunction solar cells. Chemical Physics Letters, 2006, 422, 488-491).*

Durmus, A. et al., "A neutral state green polymer with a superior transmissive light blue oxidized state," *ChemComm*, May 15, 2007, pp. 3246-3248.

Irvin, D.J. et al., Tuning the Band Gap of Easily Oxidized Bis(2-thienyl)- and Bis(2-(3,4-ethylene-dioxythiophene))-phenylene Polymers, *Polymers for Advanced Technologies*, Dec. 4, 1998, pp. 260-265, vol. 9, No. 4.

Shi, C. et al., "Regioregular Copolymers of 3-Alkoxythiophene and Their Photovaltic Application," *JACS*, Jun. 14, 2006, pp. 8980-8986, Vo. 128, No. 27.

Wienk, M.M. et al., "Low band gap polymer bulk heterojunction solar cells," *Chemical Physics Letters*, May 10, 2006, pp. 488-491, vol. 422, Nos. 4-6.

Bundgaard, E. et al., "Low-Band-Gap Conjugated Polymers Based on Thiophene, Benzothiadiazole, and Benzobis(thiadiazole)," *Macromolecules*, 2006, pp. 2823-2831, vol. 39.

Cheng, K. et al., "Small Band Gap Conjugated Polymers Based on Thiophene-Thienopyrazine Copolymers," *Journal of Polymer Science: Part A: Polymer Chemistry*, 2007, pp. 5872-5883, vol. 45.

Van Mullekom, H.A.M. et al., "Developments in the chemistry and band gap engineering of donor-acceptor substituted conjugated polymers," *Materials Science and Engineering*, 2001, pp. 1-40, vol. 32.

Pai, C-L. et al., "Electronic structure and properties of alternating donor-acceptor conjugated copolymers: 3,4-Ethylenedioxythiophene (EDOT) copolymers and model compounds," *Polymer*, 2006, pp. 699-708, vol. 47.

* cited by examiner

R = 2-EthylHexyl

M8

R = 2-EthylHexyl m=1, P5
m=2, P6
m=3, P7

R = 2-EthylHexyl

P8

R = 2-EthylHexyl

BLACK SOLUBLE CONJUGATED POLYMERS WITH HIGHLY TRANSMISSIVE OXIDIZED STATE

CROSS-REFERENCE TO RELATED APPLICATIONS

This application is the U.S. national stage application of International Patent Application No. PCT/US2008/081606, filed Oct. 29, 2008, which claims the benefit of U.S. Provisional Application Ser. No. 61/070,102, filed Mar. 19, 2008, the disclosures of which are hereby incorporated by reference in their entireties, including any figures, tables, or drawings.

The subject invention was made with government support under the Air Force Office of Scientific Research, Grant No. FA9550-06-1-0192. The government has certain rights to this invention.

BACKGROUND OF THE INVENTION

The concept of valence and conduction band broadening based on alternating electron rich and poor moieties in conjugated polymers was introduced in 1993 by Havinga et al. With the ability to obtain energy gaps as narrow as 0.5 eV, a new dimension was added to the notion of band gap engineering and the "donor-acceptor" theory on a macromolecular level was born. In spite of the considerable impact of this discovery for device applications such as field-effect transistors, light emitting diodes and photovoltaics, only recently has the use of donor-acceptor based conducting polymers been directed to electrochromic polymers (ECPs).

ECPs have a rather unique combination of mechanical flexibility, high contrast ratios, fast response times, and the inherent potential for fine color tunability by control of the structure. Polymeric electrochromes are the most attractive alternatives to metal-oxides (MOs) for both reflective and absorptive/transmissive electrochromic devices (ECDs) and displays.

Recently, the focus of developments has been directed generally to incorporating ECPs as fast and reversible color changing materials in devices such as windows, mirrors and displays. While a number of red, blue and recently green (RGB) candidates for completion of the additive primary color space were reported, attempts in making saturated black polymers have not been successful due to the complexity in designing materials that absorb effectively over the entire visible spectrum. Such saturated black ECPs would be highly valuable for the fabrication of polymer-based solar cells (PSCs) where efforts continue to identify and prepare materials that absorb homogeneously over a broad bandwidth of the UV-visible spectrum.

Strongly absorbing ECPs, which can switch to a highly transmissive state, have remained a challenge, primarily because of the difficulty of achieving simultaneous and efficient bleaching of all absorption bands over the visible region. Generally, as the doping level induced by chemical or electrochemical redox control is progressively increased in ECPs, charged carriers balanced with counter ions arise along the backbone, changing the intrinsic optical transitions of the polymer. Sufficiently low energy-gap polymers undergo oxidative (p-type) doping with the formation of radical cations (polarons) and dications (bipolarons) that absorb in the near-IR, depleting the ground-state optical transitions of the electroactive material in the visible region.

BRIEF SUMMARY OF THE INVENTION

The invention is directed to donor-acceptor conjugated polymers (DA-CPs) where acceptor repeating units are dispersed between a plurality of donor repeating units, where the DA-CP can be soluble and is highly absorbent of visible light such that it appears black to the human eye as a thin film. The DA-CPs are generally donor-acceptor electrochromic polymers (DA-ECPs), as the DA-CP can be highly absorbent of visible light in one redox state appearing essentially black and can be colored or highly transmissive to all visible light in a different redox state. The DA-CPs have acceptor repeating units that can be individually isolated from each other by at least 2 donor repeating units or where a sequence of a plurality of acceptor repeating units are isolated from each other by sequences comprising at least 2 donor repeating units. The sequence of donor repeating units can have an even number of monodispersed sequences between acceptor repeating units, or can be in sequences that are polydispersed between acceptor repeating units, however the smallest sequence of donor repeating units remains at least two donor repeating units.

The acceptor repeating units in the DA-CPs can be 2,1,3-benzothiadiazole (BTD) units or any derivative of thiadiazoloquinoxaline, quinoxaline, thienothiadiazol, thienopyrazine, pyrazinoquinoxaline, benzobisthiadiazole, or thiadiazolothienopyrazine, and a plurality of different acceptor units can be used in any combination. Combined with these acceptor units are donor units. The donor units can be thiophene containing repeating units such as a 3,4-bis(alkoxy)thiophene or a bis-alkyloxy substituted 3,4-alkylene-dioxythiophene. The DA-CP can have donor units where at least one mono-, di- or poly-alkyloxy substituted thiophenes, at least one mono-, di- or poly-aryloxy substituted thiophenes, at least one di- or poly-aryloxy alkoxy substituted thiophenes, at least one mono-, di- or poly-alkoxy substituted 3,4-alkylenedioxythiophenes, at least one mono-, at least one di- or poly-aryloxy substituted 3,4-alkylenedioxythiophenes, and at least one di- or poly-aryloxy alkoxy substituted 3,4-alkylenedioxythiophenes are incorporated separately or in any combination.

The invention is also directed toward the preparation of the soluble DA-CPs described above where a polymerization mixture is provided that has a plurality of at least one DA-oligomer with at least one interior acceptor repeating unit, and at least one donor repeating unit at both termini of the DA-oligomer, and polymerizing the mixture to give the DA-CP that is highly absorbent of visible light and appears black to the human eye as a thin film. In one embodiment, the DA-oligomer can have at least one oligomer of the structure H-(D)$_m$-A-(D)$_{m'}$-H and/or H-(D$_x$D'$_y$)-A-(D$_x$D'$_{y'}$)-H where A is an acceptor unit, D and D' are different donor units, m and m' are independently 1 to 5 and are monodispersed or polydispersed, x is 0 to m, x' is 0 to m', y is m-x, y' is m'-x', and wherein either D or D' can be adjacent to A or a terminal unit. In another embodiment of the method the DA-oligomer can be H-(D)$_m$-A-(D)$_{m'}$-H and/or H-(D$_x$D'$_y$)-A-(D$_x$D'$_{y'}$)-H and include at least one additional oligomer of the structure H-(D$_x$D'$_y$)-A'-(D$_x$D'$_{y'}$)-H, H-(D$_x$D'$_y$)-(A)$_n$-(D$_x$D'$_{y'}$)-H, H-(D$_x$D'$_y$)-(A')$_n$-(D$_x$D'$_{y'}$)-H, H-(D$_x$D'$_y$)-(A$_w$A'$_z$)-(D$_x$D'$_{y'}$)-H, H-[(D$_x$D'$_y$)-(A)]$_n$-(D$_x$D'$_{y'}$)-H, and H-(D$_x$D'$_y$)-A-(D$_x$D'$_{y'}$)-A'-(D$_{x''}$D'$_{y''}$)-H, where A and A' are different acceptor units, D and D' are different donor units, m, m', m'' and n are independently 1 to 5 and are monodispersed or polydispersed, x is 0 to m, x' is 0 to m', x'' is 0 to m'' y is m-x, y' is m'-x', y'' is m''-x'', n is 1 to 5, n' is 1 to 5, w is 0 to n', z is n'-w and where either D or D' can be adjacent to A, A' and a terminal unit. In addition to the DA-oligomers, the DA-CPs can be formed from a polymerization mixture that also includes a plurality of at least one monomer that is a donor unit, which can be the same or a different donor unit than donor units of the DA-oligomer.

BRIEF DESCRIPTION OF THE DRAWINGS

FIG. 1 shows, 1(a), chemical structures according to embodiments of the invention of donor-acceptor electrochromic polymers (DA-ECPs) and a donor containing polymer, the Donor-acceptor oligomers (DA-oligomers) and donor monomer that are polymerized to achieve the polymers. The absorption spectra for the polymers are shown in 1(b). A color photograph of solutions of the polymers is shown in 1(c).

FIG. 3 shows, 3(a), chemical structures according to embodiments of the invention of donor-acceptor electrochromic polymers (DA-ECPs) and a donor containing polymer, the Donor-acceptor oligomers (DA-oligomers) and donor monomer that are polymerized to achieve the polymers. The absorption spectra for the polymers are shown in 3(b). A color photograph of solutions of the polymers is shown in 3(c).

FIG. 5 shows the structure of a random copolymer DA-ECP from a DA-trimer and donor monomer in 5(a) according to an embodiment of the invention, the DA-ECP's absorption spectra for a thin film through the visible and near IR range at various stages of electrochemical doping in 5(b), and a color photograph of the DA-ECP film in the neutral and fully oxidized state in 5(c).

DETAILED DESCRIPTION OF THE INVENTION

Donor and acceptor units are used to achieve novel high-contrast electrochromic polymers (ECPs) that exhibits absorption in the visible where multiple energy transitions are controlled by varying the relative contribution of electron rich and poor moieties incorporated in the repeat unit of the donor-acceptor ECPs (DA-ECPs) as well as the first black-colored polymeric electrochromes. The DA-ECPs of the invention have repeat units constructed using internal acceptor units that are combined with terminal donor units to form a polymerizable oligomer, a DA-oligomer. The DA-oligomers are subsequently polymerized to yield the DA-ECP, resulting in short and long wavelength bands that overlap and yields neutral state colored materials possessing various color hues and saturations, where incorporation of a sufficient number of donor units yields a copolymer with an absorption spectrum that extends over the entire visible spectrum. The DA-ECPs can undergo rapid and reversible switching from their opaque neutral state to a highly transmissive oxidized state in a potential window of less than 1 V, making them useful for low-voltage device applications. Furthermore, the DA-ECPs of the invention can be easily processed into electrochromic devices using convenient deposition methods, such as spin-coating, spray-casting, and a variety of printing methods (e.g. ink jet printing). Absorption across the entire visible region of the neutral polymer, along with charge transport properties, allows the novel donor-acceptor conjugated polymers (DA-CPs) to be used for black colored solar cells.

Figure 1A:
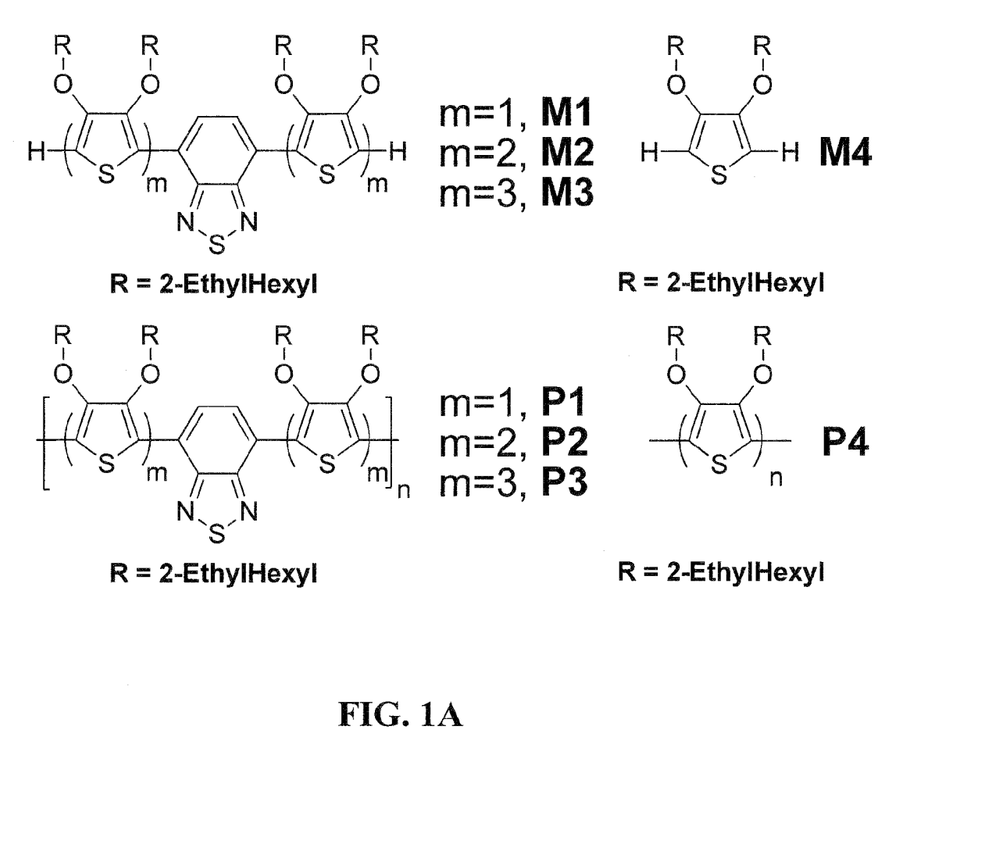
Figure 1B:
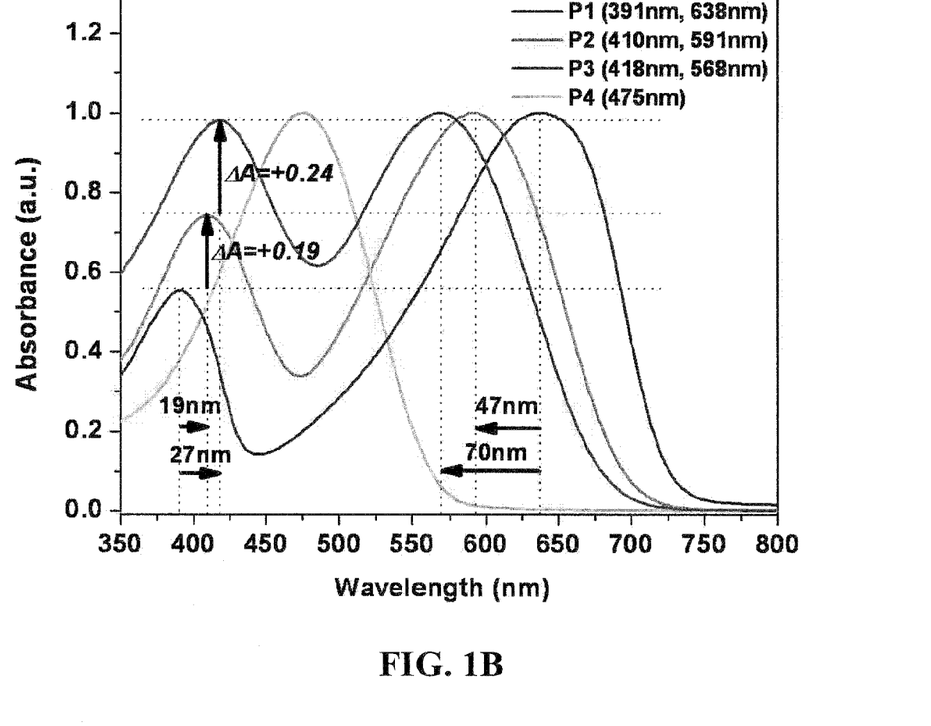

The inventive black neutral state DA-CP has a structure that contains isolated internal acceptor units, or isolated sequences of acceptor units, that are separated from other acceptor units by a sequence of two or more donor units. The absorption spectrum of the DA-CP depends upon the proportion of donor and acceptor units. In general, the wavelength difference for a low energy maximum absorption and a high energy maximum absorption of the DA-CP become smaller, while the absorption peaks retain or increase their breadth and achieve greater overlap as the wavelength maxima difference decreases. For example, in one embodiment of the invention, where the core acceptor unit is a single 2,1,3-benzothiadiazole (BTD) unit and the donor units are 3,4-bis(2-ethylhexloxy)thiophene (DOT-(OEtHx)$_2$) units, as the specific number of DOT-(OEtHx)$_2$ units between each BTD unit in a DA-ECP increases from 2 to 4 to 6 units, as shown in FIG. 1a as P1, P2 and P3, respectively, absorption maxima differences decrease from 247 to 181 to 150 nm, as shown in FIG. 1b. In the case of 6 DOT-(OEtHx)$_2$ units separating the BTD units, P3, the overlap is sufficient such that a nearly homogeneous absorption is observed, and only a small transmission of light at 625-700 nm and 450-550 nm occurs, which results in a dark brown hue to the otherwise black DA-ECP for P3. For many applications the DA-CP that is used can be effectively black in appearance to the human eye as the contrast relative to other hues within a display is sufficiently high even though the entire visible spectrum is not completely or evenly absorbed. In other applications the DA-CP can be of a composition where the entire spectrum is highly absorbed throughout the entire visible spectrum.

Figure 1C:
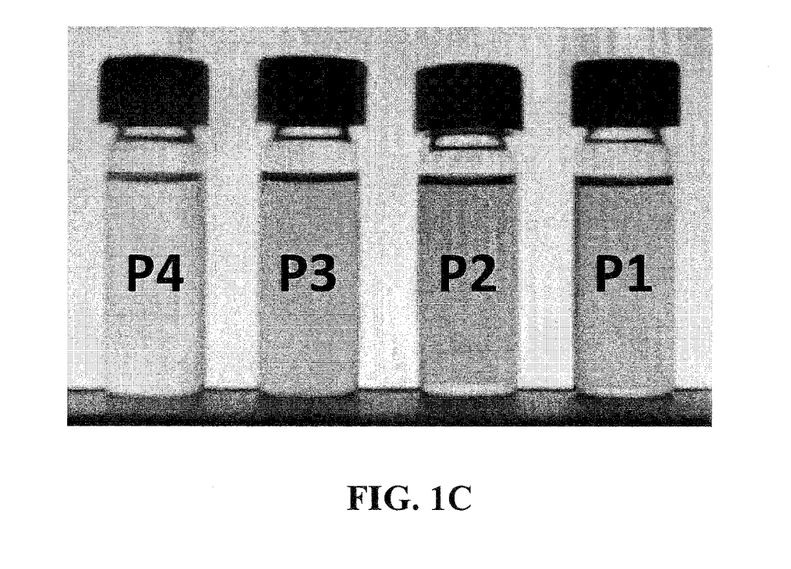
Figure 2:
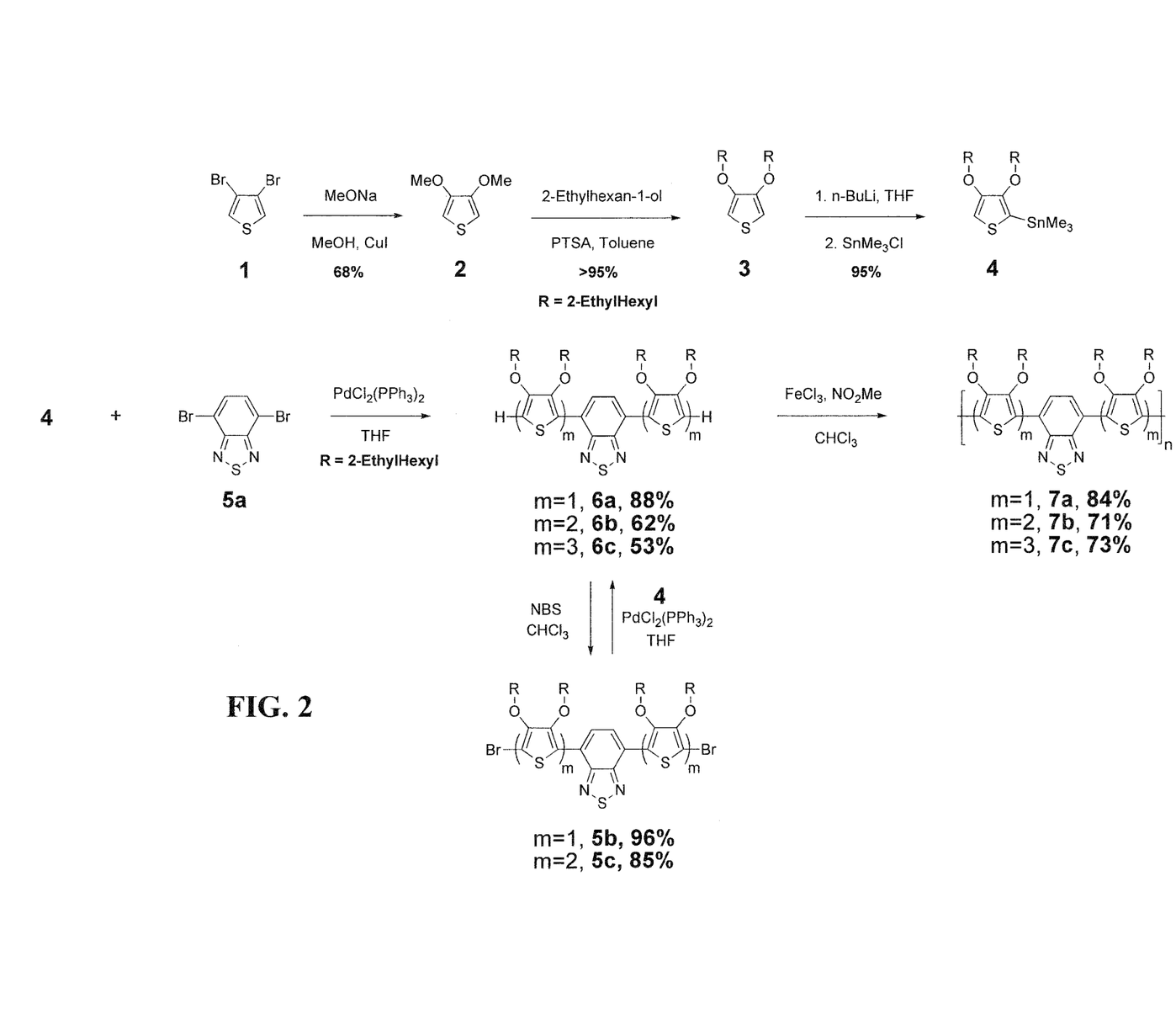
FIG. 2 is a reaction scheme showing the preparation of the donor monomers, DA-oligomers, and homopolymers of DA-oligomers according to an embodiment of the invention.

The synthetic approach to the DA-oligomers of FIG. 1a, is shown in FIG. 2, where M1, M2, and M3 of FIG. 1 are labeled 6a, 6b, and 6c, respectively, in FIG. 2. As shown in FIG. 2, a pair of monostannylated 3,4-dialkoxythiophene, for example 4, can be coupled with an acceptor unit precursor, for example 5a. Appropriate reactions and conditions for preparation of the ethers, such as those illustrated in FIG. 2 are known to those skilled in the art.

In embodiments of the invention as illustrated in FIG. 2, a Stille reaction can be used to couple organotin compound 4 with a dibrominated acceptor unit precursor 5a. Other halogens, such as chlorine, iodine, or even fluorine can be used in place of the bromine on the acceptor containing species. The acceptor unit precursors can be, but are not necessarily, symmetrically halogenated. Halogens can be positioned on equivalent sites of the acceptor containing species such as 5a. Stille reaction processes are well known in the art, and can be carried out using, for example, a Palladium (0) or, as illustrated in FIG. 2, Palladium (II) catalyst. Soluble DA-oligomers, such as 6a of FIG. 2, can be isolated by various techniques, including, for example, column chromatography. The DA-oligomer can be halogenated, as indicated by bromination to compound 5b of FIG. 2, and coupled with another pair of monostannylated 3,4-dialkoxythiophene, for example 4 of FIG. 2, to form a DA-oligomer, such as 6b of FIG. 2, where two donor repeating units are attached to each side of the acceptor repeating unit. The DA-oligomer can have an additional donor repeating unit added, for example formation of 6c via 5c as shown in FIG. 2. Although FIG. 2 illustrates the formation of DA-oligomers having a single donor repeating unit, the donor units can be different by using different organotin compounds in successive Stille reactions. Although Stille reactions have been illustrated other coupling reactions such as Kumada coupling, Hiyama coupling, Negishi coupling and Suzuki coupling can be employed, as known by those skilled in the art. The organotin substituent of the organotin compound can be replace with any suitable substituent, such as an organoboron, organomagnesium, organozinc, or organosilane substituent to carry out an alternate coupling reaction as can be designed by one skilled in the art.

The DA-oligomers can be polymerized in a step-growth fashion where a single DA-oligomer or a combination of different DA-oligomers can be employed. FIG. 2 illustrates the ferric chloride condensation of individual DA-oligomers 6a, 6b and 6c to form DA-CPs 7a, 7b and 7c. Those skilled in the art can readily identify other systems for the polycondensation of the DA-oligomers.

As illustrated in FIG. 2, the exemplary stepwise condensation and bromination of the DA-oligomers result in a progressively lower reaction yield as one proceeds from the DA-trimer, M1, to the DA-heptamer, M3. This systematic loss of yield is not indicative of the polymerization of the DA-oligomers, as shown in FIG. 2, where the formation of P1, P2, and P3 (7a, 7b and 7c of FIG. 2) occurs with similar conversion with no systematic change in the isolated yields with the DA-oligomer size.

As shown in FIG. 1b, the homopolymer of DOT-(OEtHx)$_2$, P4, absorbs with a maximum of 475 nm. Hence a copolymerization of a DA-oligomer, or mixture of DA-oligomers, can be carried out to enhance the relative absorption in a desired portion of the visible spectrum. For example, the copolymerization of the DA-trimer, M1 of FIG. 1a, with DOT-(OEtHx)$_2$ can retain the absorption at 625-700 nm, as in P1, and enhance the absorption at 450-550 nm to give a black DA-CP without the brown hue. This ability to carry out this random copolymerization also diminishes the number of synthetic steps needed to achieve a black DA-CP as four synthetic transformations required to convert from M1 to M3 can be eliminated from the process from starting reagents to black DA-CP.

Figure 3A:
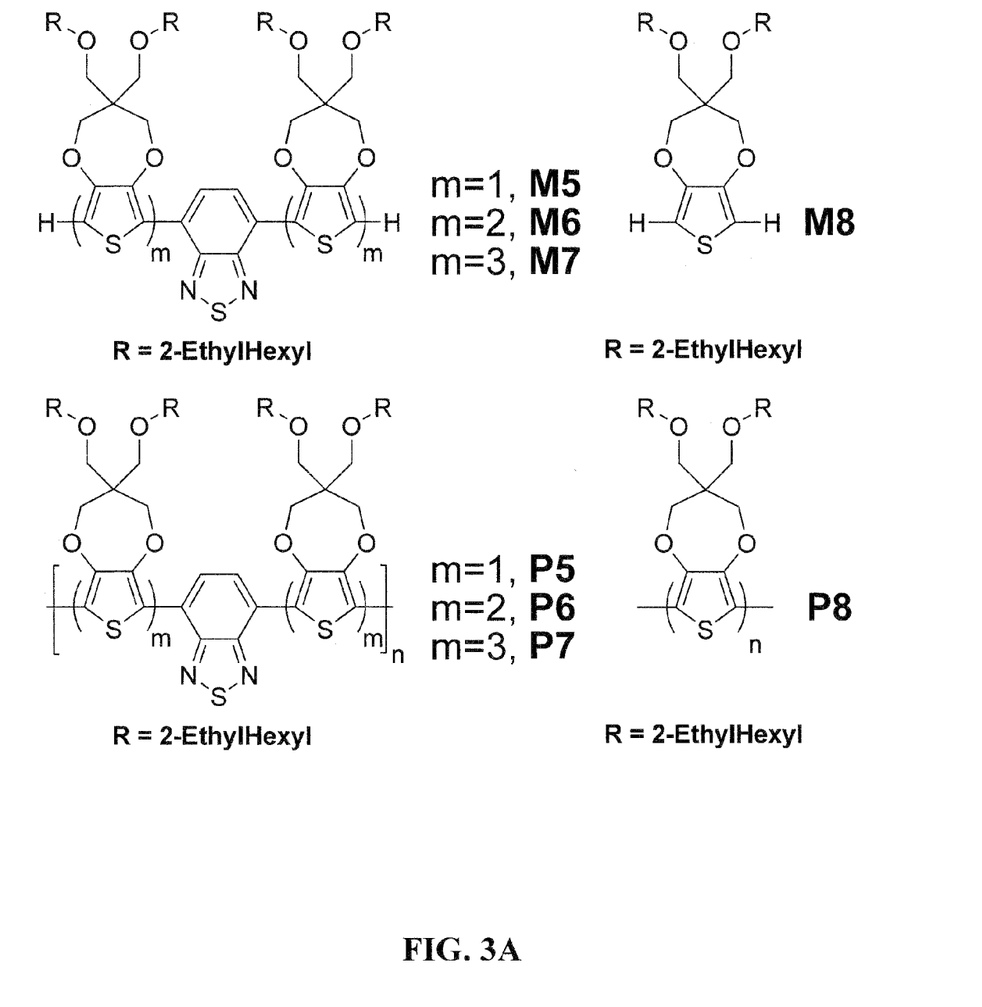
Figure 3B:
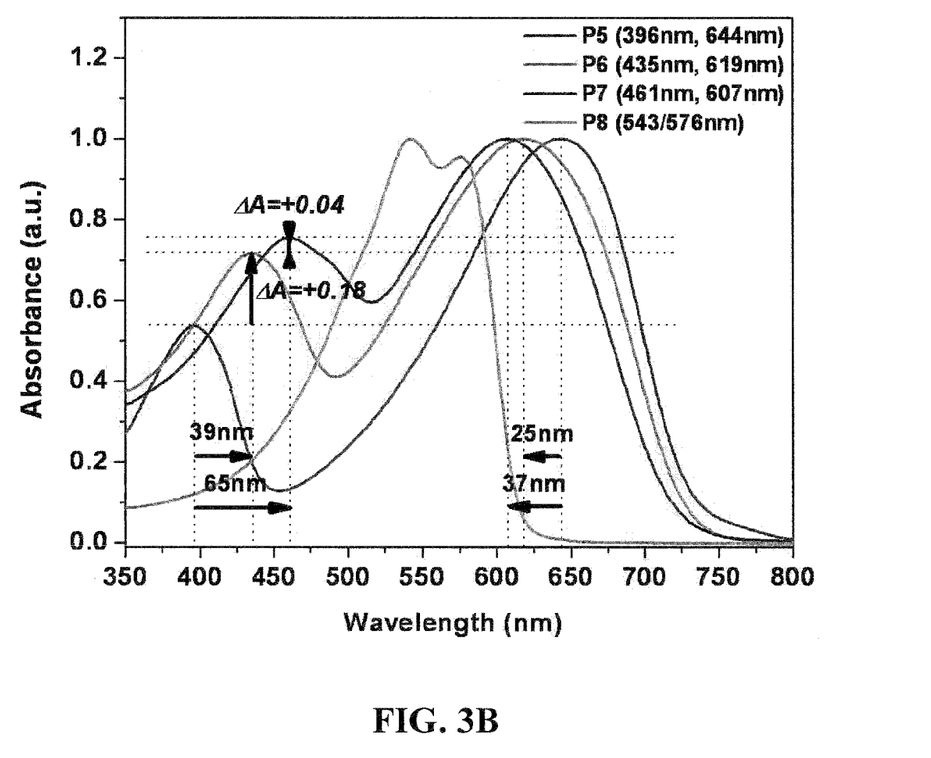
Figure 3C:
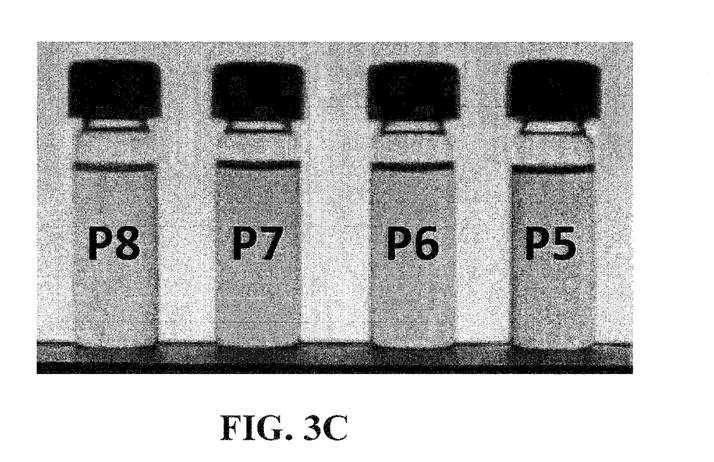
Figure 4:
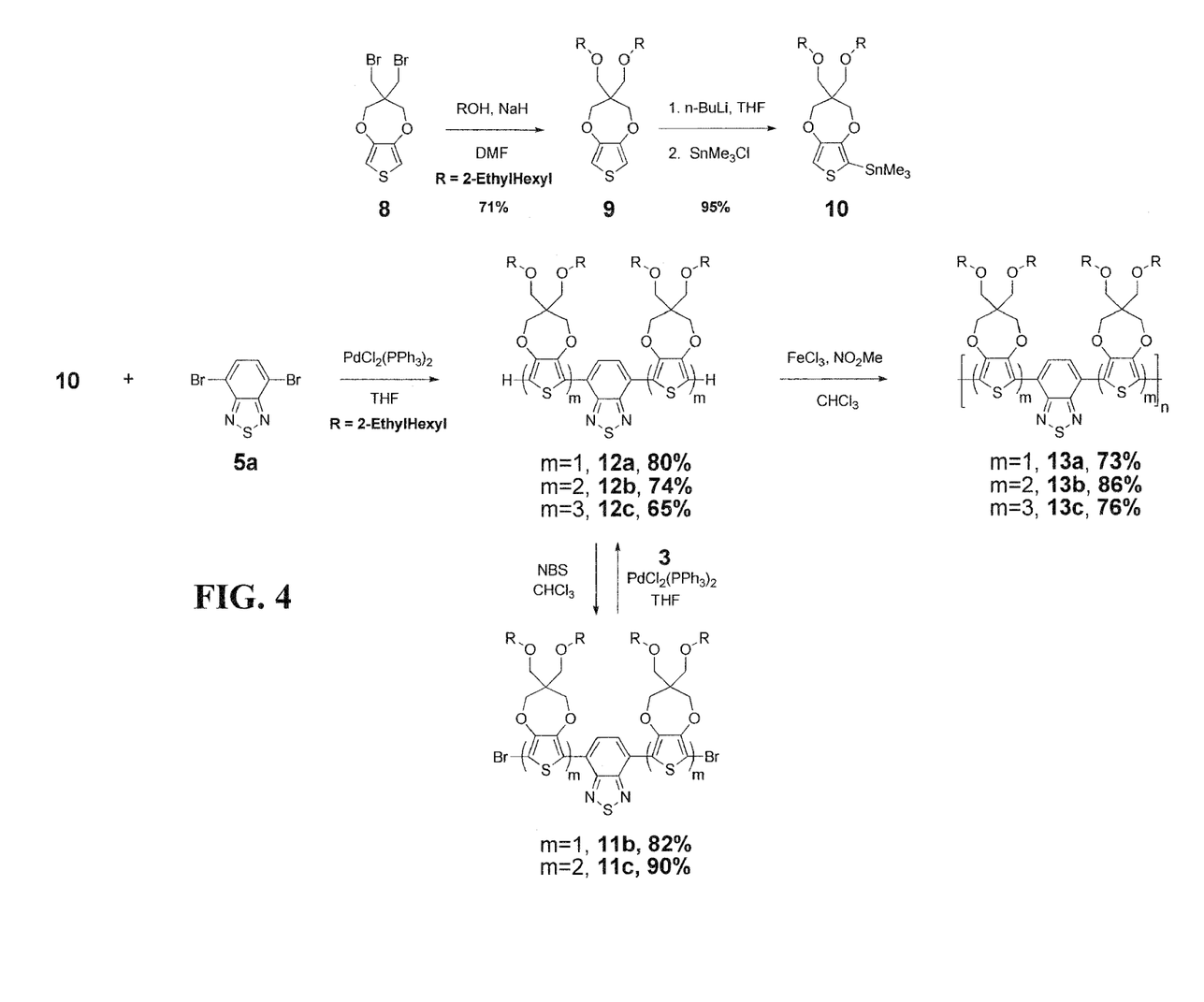
FIG. 4 is a reaction scheme showing the preparation of the donor monomers, DA-oligomers, and homopolymers of the DA-oligomers according to an embodiment of the invention.

In another embodiment of the invention, copolymers can be formed, as illustrated in FIG. 3, from DA-oligomers with an internal BTD as the acceptor and bis-2-ethylhexyloxy substituted 3,4-propylenedioxythiophene, M5, M6, and M7 of FIG. 3, as the donors. As opposed to the 3,4-bis(alkoxy) thiophenes, the 3,4-alkylenedioxythiophenes are stronger donors, having a higher HOMO than the 3,4-bis(alkoxy) thiophenes, which, accordingly, narrows the band-gap of the subsequent polymers without any change in the acceptor unit. As can be seen in FIG. 3b, the blue shift of the low energy absorption maximum, as one proceeds from P5 to P7, is very small and the red light is effectively absorbed by P7, unlike P3 of FIG. 1. However, the red shift of the high energy absorption maximum, as one proceeds from P5 to P7, is more pronounced than from P1 to P3, resulting in a blue transmission in the 400 to 450 nm region. FIG. 4 shows the synthesis of the DA-oligomers from 3,4-alkylenedioxythiophenes, M5, M6 and M7 (labeled as 12a, 12b and 12c, respectively) and their DA-CPs P5, P6 and P7 (labeled 13a, 13b and 13c, respectively) where, although DA-oligomer yields differ to a lesser degree, the efficiency cost, of preparing a nearly black DA-CP by a multistep synthesis of a DA-heptamer, is illustrated. Again, as in FIG. 2 for the 3,4-bis(alkoxy)thiophene based DA-CPs; polymerization shows no systematic difference in isolated yield.

Figure 5A:
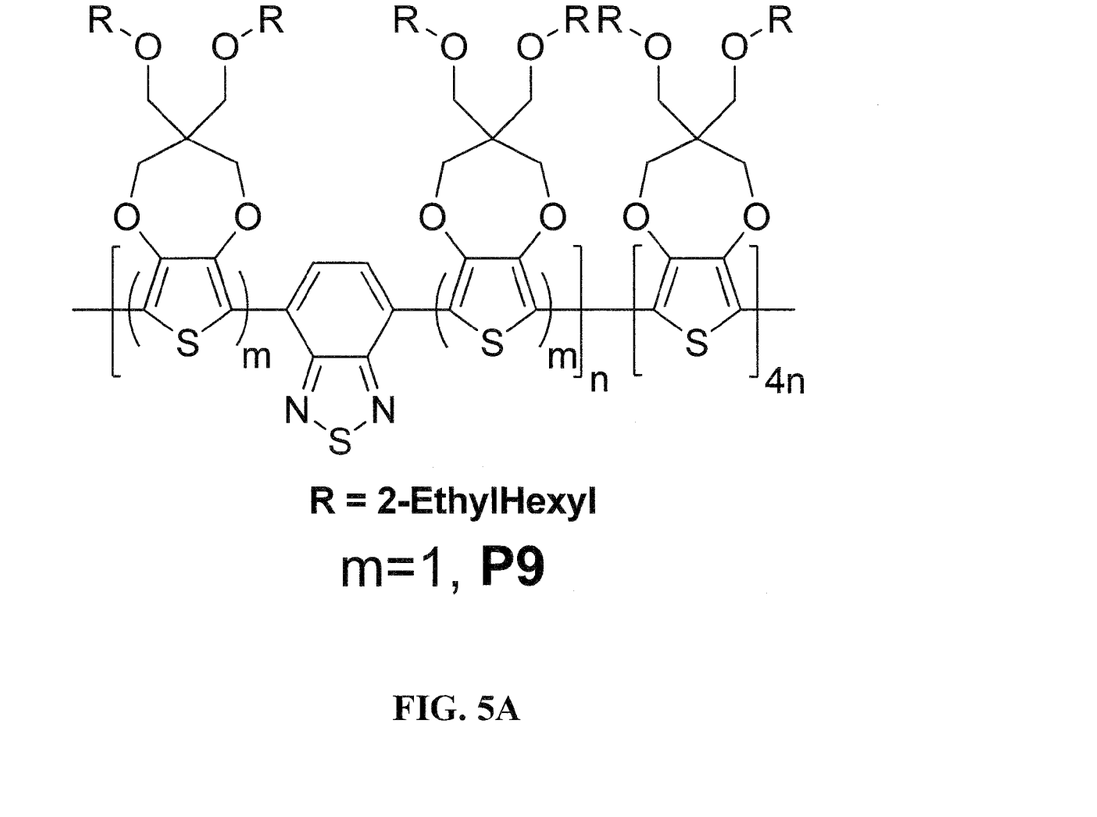
Figure 5B:
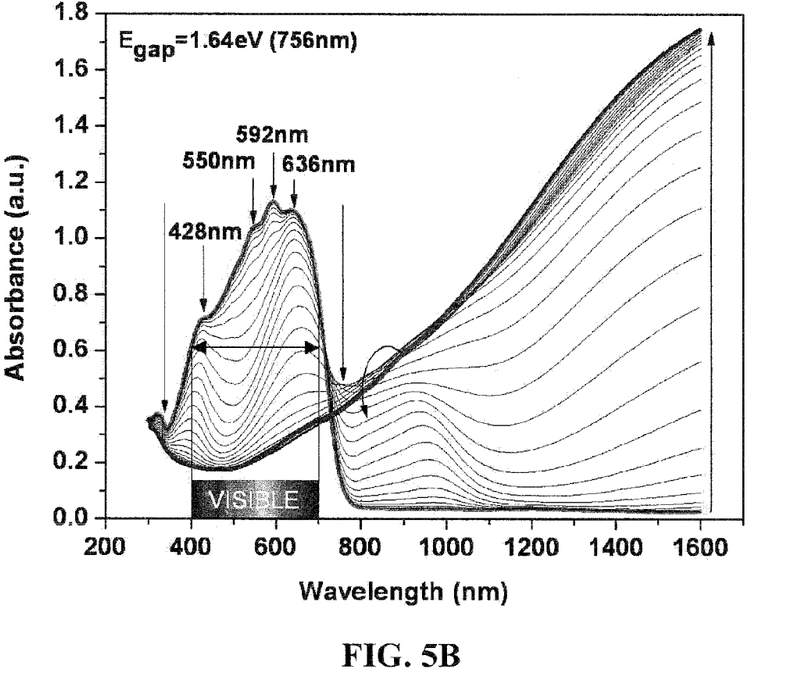
Figure 5C:
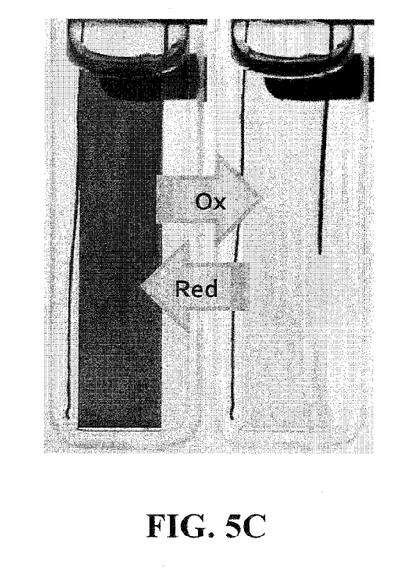

The copolymerization of DA-oligomer M5 with bis-2-ethylhexyloxy substituted 3,4-propylenedioxythiophene, M8 of FIG. 3b, was carried out to give a copolymer, P9 of FIG. 5a. When the comonomer ratio of M8 to M5 was 4, a nearly random copolymer, P9, is formed that has equivalent numbers donor and acceptor repeating units as does the regular copolymer P7. However, the absorption spectrum for the 4 to 1 M8 to M5 copolymer, as shown in FIG. 5b, is very different than that for P7 of FIG. 3b. In this case, a significantly greater absorption occurs in the blue region of 400 to 450 nm, and is consistent with a 4 to 1 random copolymer, where sequences with 2 donor units between acceptor units would be about 20% of all donor sequences, those with 3 donors being about 16% of donor sequences, and those with 4 donors units being about 13% of all donor sequences, while those in excess of 5 donor units comprising more than 40% of the donor sequences. The polymerization proceeded to the formation of a polymer of about 14 kDa with a dispersivity of less than 2, which is consistent with a degree of polymerization of approximately 30. The neutral DA-CP, P9, is black with no discernable color to the human eye as a solid thin film. The DA-CP displayed no significant optical change from room temperature to 100° C., suggesting no significant aggregation of the polymer or change in the effective conjugation length with temperature throughout this temperature range.

The thin film was prepared by spray-casting a 4 mg/mL toluene solution of P9 onto ITO-coated glass, which was subsequently redox cycled until a stable and reproducible switch was achieved. Electrochemical oxidation of the film was carried out using a 0.1 M LiBF$_4$/propylene carbonate supporting electrolyte with a silver wire quasi-reference electrode (calibrated against Fe/Fc$^+$) and a platinum wire counter electrode. FIG. 5b shows that applying a –0.1 V potential to the film simultaneously bleaches all absorption bands of this DA-ECP. As the bleaching occurs, polaronic and bipolaronic transitions arise in the near-IR as is consistent with a colored to transmissive film. Using the absorption maximum of 1.13 a.u. at 592 nm as a reference, the transmittance change is approximately 51.5% upon electro-oxidation, which is considered a high electrochromic contrast. As indicated above, the film transitions from black when neutral, to transparent when doped.

Figure 6:
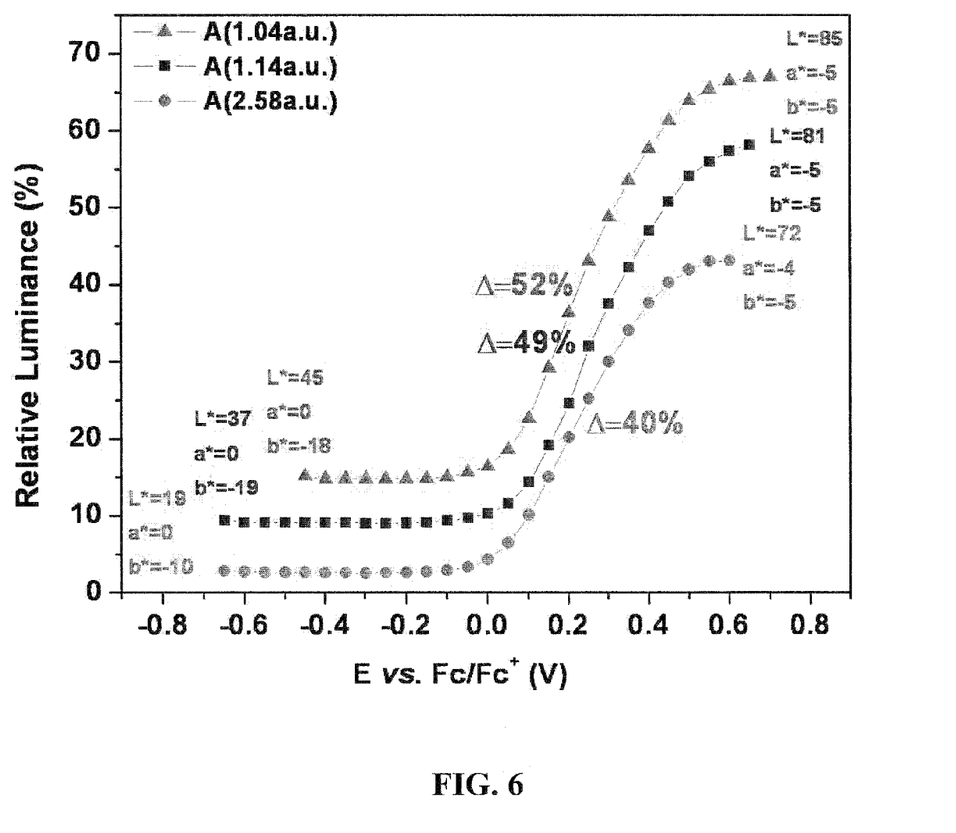
FIG. 6 is a plot of the relative luminance of the random copolymeric DA-ECP of FIG. 5 at three film thicknesses as related to their absorbance maxima.

The relative luminance, defined as the transmittance of a material to visible light calibrated to the sensitivity of the human eye was measured for various film thicknesses of DA-ECP P9, reflected by the absorbance maximum of the films of 1.04, 1.14 and 2.58 a.u. (L* values of 19, 37, and 45 where L* is the CIELAB color designations representing the lightness of the color where 0 indicates black and 100 indicates white). Upon electrochemical oxidation, as shown in FIG. 6, as doping proceeds from the neutral to fully oxidized transmissive state, the L* values increase to 72, 81, and 85 and the relative luminescence change varies from 52% for the 1.04 a.u. (thinnest) to 40% for the 2.58 a.u. (thickest) films. The film completes it switch over a potential of less than 0.8 V and the L* values indicate the polymer can nearly reach the "white point" (W) of color space.

In other embodiments of the invention, the acceptor unit BTD and either the donor unit 3,4-bis(2-ethylhexloxy) thiophene or bis-2-ethylhexyloxy substituted 3,4-propylenedioxythiophene can be substituted with other acceptor units, combinations of different acceptor units, other donor units, and combinations of different donor units. For example, other acceptor units can be derivatives of thiadiazoloquinoxaline, quinoxaline, thienothiadiazol, thienopyrazine, pyrazinoquinoxaline, benzobisthiadiazole, and/or thiadiazolothienopyrazine. The donor substituents can be, individually or in combination, any solubilizing side-chain containing electron rich heterocyclic, including fused systems such as cyclopentadithiophene, thienothiophene and fluorene derivatives, for example.

For purposes of the invention, the solubilizing side-chains can be a straight or branched alkyl chain of, for example, 1-24 carbon atoms and is, for example, methyl, ethyl, n-propyl, n-butyl, sec butyl, tert-butyl, n-hexyl, n-octyl, 2-ethylhexyl, n-nonyl, n-decyl, n-undecyl, n-dodecyl, n tridecyl, n-tetradecyl, n-hexadecyl, n-octadecyl or dodecanyl and the like. Alkylene is a chain of, for example, 2-5 carbon atoms and is, for example, ethylene, propylene, butylene, pentalene, and the like. The alkyl or alkylene can be interrupted, one or more times, by one or more oxygen atoms, sulfur atoms, —SO—, —SO$_2$—, carbonyl, —COO—, —CONH—, —NH—, —CON(C$_{1-8}$ alkyl)- or —N(C$_{1-8}$ alkyl)- and the like. For example, the alkyl group can be interrupted, one or more times, by one or more oxygen atoms, sulfur atoms, carbonyl, —COO—, —NH— or —N(C$_{1-8}$ alkyl)-. The uninterrupted or interrupted alkyl or alkylene can also be substituted, one or more times, by one or more C$_{3-6}$ cycloalkyl groups, halogen, —OR, —COOR, —COOM, —SO$_3$M, —SO$_3$H, phosphonic acid, halogen, —CONR'R, —NR'R, phosphonate salt, ammonium salt or group of the formulae -L-Ar or —C(O)-L-Ar wherein M is a nitrogen cation or metal cation, R and R', independently of any other R or R' that may be present is hydrogen; a group -L-Ar, —C(O)-L-Ar, or —C(O)—O-L-Ar; C$_{1-24}$ alkyl, C$_{3-24}$ alkenyl, C$_{3-6}$ cycloalkyl or C$_{1-24}$ alkylcarbonyl which is uninterrupted or interrupted, one or more times, by one or more oxygen atoms, sulfur atoms, carbonyl, —COO—, —CONH—, —NH—, —CON(C$_{1-8}$ alkyl)- or —N(C$_{1-8}$ alkyl)-, where uninterrupted or interrupted alkyl, alkenyl, cycloalkyl or alkylcarbonyl are unsubstituted or substituted, one or more times, by one or more halogen, —OH, C$_{7-12}$ aralkyl, C$_{2-12}$ alkylcarbonyl, C$_{1-24}$ alkoxy, C$_{2-24}$ alkylcarboxy, —COOM, —CONH$_2$, —CON(H)(C$_{1-8}$ alkyl), —CON(C$_{1-8}$ alkyl)$_2$, —NH$_2$, —N(H)(C$_{1-8}$ alkyl), —N(C$_{1-8}$ alkyl)$_2$, —SO$_3$M, phenyl, phenyl substituted, one or more times, by one or more C$_{1-8}$ alkyl, naphthyl, naphthyl substituted, one or more times, by one or more C$_{1-8}$ alkyl ammonium salt, phosphonic acid or phosphonate salt or when attached to a nitrogen atom, R and R', together with the nitrogen atom to which they are attached, form a 5-, 6- or 7-membered ring that is uninterrupted or interrupted by —O—, —NH— or —N(C$_{1-12}$ alkyl)-; L is a direct bond or C$_{1-12}$ alkylene that is uninterrupted or interrupted by one or more oxygen atoms and is unsubstituted or substituted, one or more times, by one or more —OH, halogen, C$_{1-8}$ alkyl, C$_{1-24}$ alkoxy, C$_{2-24}$alkylcarboxy, —NH$_2$, —N(H)(C$_{1-8}$ alkyl), —N(C$_{1-8}$ alkyl)$_2$ or ammonium salt.

For the purposes of the invention aryl is C$_{6-10}$ aromatic or C$_{1-9}$ saturated or unsaturated heterocycle that is unsubstituted or substituted, one or more times, by one or more halogen, —OH, C$_{1-24}$ alkoxy, C$_{2-24}$ alkylcarboxy, —COOQ'', —CONH$_2$, —CON(H)(C$_{1-8}$ alkyl), —CON(C$_{1-8}$ alkyl)$_2$, —NH$_2$, N(H)(C$_{1-8}$ alkyl), —N(C$_{1-8}$ alkyl)$_2$, —SO$_3$M, SO$_3$H, ammonium salt, phosphonic acid, phosphonate salt, C$_{1-24}$ alkyl that is unsubstituted or substituted, one or more times, by one or more halogen, wherein Q'' is hydrogen, metal cation, glycol ether, phenyl or benzyl, or phenyl or benzyl substituted, one or more times, by one or more halogen, hydroxy, C$_{1-24}$ alkoxy or C$_{1-12}$ alkyl.

The pendent groups of the donor repeating units can be those which can be converted from a solubilizing unit to one that is insoluble, as is described in "The Chemical Defunctionalization of Polymeric Alkylenedioxyheterocyclics" by Reynolds et. al., International Application No. PCT/US2007/061016; filed Jan. 25, 2007 and published as International Publication No. WO 2007/087587 A2 on Aug. 2, 2007, and incorporated herein by reference. By using such pendant groups on the donor repeating units, the soluble DA-CP can be converted into an insoluble DA-CP for applications where the environment of the device employing the DA-CP would not be conducive to the use of a soluble DA-CP, yet the ability to fabricate the device from solution before chemical defunctionalization allows the desirable solution processable features of the present invention.

The proportions of donor to acceptor units in the DA-ECP can vary from that of a homopolymerized DA-trimer, such as H-D-A-D-H similar to M1 or M5, where two donor units reside between each acceptor unit in the polymer, to one where a donor monomer is copolymerized with a DA-trimer or other DA-oligomer where the proportion of donor units to acceptor units can be large, effectively with no limit to the D/A ratio, although for most copolymerization systems D/A will be less than about 10.

Combinations of different DA-oligomers H-(D)$_m$-A-(D)$_{m'}$-H, where m and m' can be independently 1 to 5 and monodispersed or polydispersed sequences, can be used in embodiments of the invention to yield different DA-CPs. DA-oligomers with different donor units, for example, H-(D$_x$D'$_y$)-A-(D$_x$D'$_{y'}$)-H where donor sequences can be monodispersed or polydispersed with a randomly or regularly placement of D and D' units with either D or D' adjacent to the acceptor unit, A and/or the termini, x can be 0 to m, x' can be 0 to or m', y=m-x, and y'=m'-x' where m and m' can be independently 1 to 5. Mixtures of different DA-oligomers can be copolymerized with or without additional donor monomers. The donor monomers can provide different donor units to the DA-CPs than those donor units provided by the DA-oligomers. Different DA-oligomers, optionally with different monomers, can be chosen for copolymerization to a DA-CP with sequences chosen to provide absorption at different portions of the visible spectrum. For example, M2 and M7 can be copolymerized, with or without additional donor monomers, where the sequences in the resulting copolymer from coupled M2 DA-pentamers provide an absorbance maximum at about 410 nm while the sequences from coupled M7 DA-heptamers provide an absorbance maximum at about 607 nm allowing for good absorption of red and blue and throughout the visible range.

In addition to the H-(D)$_m$-A-(D)$_{m'}$-H and H-(D$_x$D'$_y$)-A-(D$_x$D'$_{y'}$)-H type DA-oligomers described above, DA-oligomers with additional acceptors, such as H-(D$_x$D'$_y$)-(A)$_n$-(D$_x$D'$_y$)-H, H-(D$_x$D'$_y$)-(A$_w$A'$_z$)-(D$_x$D'$_y$)-H H-[(D$_x$D'$_y$)-(A)]$_n$-(D$_x$D'$_y$)-H, H-(D$_x$D'$_y$)-A-(D$_x$D'$_{y'}$)-A'-(D$_{x''}$D'$_{y''}$)-H, and or any combination or variation thereof can be used in an embodiment of the invention, where D, D', x, y, x', y', m, and m' are as defined previously, n is 1 to 5, n' is 1 to 5, w is 0 to n', z is n'-w and where A' is a second acceptor unit, n is monodispersed or polydispersed. Additionally, the donor units can be incorporated by a copolymerization of the DA-oligomers with monomeric donors and/or oligomeric donors (D-oligomers) can be used for copolymerization in addition to or in place of any donor monomers. For example, the D-oligomers can have the structure H-(D)$_x$-H, H-(D)$_x$(D')$_y$—H, H-(D)$_x$(D')$_y$(D)$_x$-H, or H-(DD')$_x$-H, where x and y are monodispersed or polydispersed, or the D-oligomers can have any regular or random combination of two or more donor units. Mixtures of D-oligomers and monomers can be included in the copolymerization mixtures. Other variations in the composition of DA-oligomers, D-oligomers, and monomers, in addition to those described above, can be used to form the DA-ECPs of the invention, as can be appreciated by those skilled in the art.

The DA-ECPs of the invention are useful for a wide variety of electrochromic devices, including: electrochromic windows, mirrors, displays, and electrochromic paper. Further, the polymers can be used as DA-CPs in polymeric solar cell applications; photovoltaic devices; anti-stat conductors, transparent conductors, field effect transistors, supercapacitors, batteries and other electronic components.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A donor-acceptor conjugated polymer (DA-CP) comprising acceptor repeating units dispersed between a plurality of donor repeating units, wherein said plurality of donor repeating units comprise 3,4-bis(alkoxy)thiophene, bis-alkoxy substituted 3,4-alkylenedioxythiophene, or any combination thereof, wherein said donor repeating units are present in polydispersed sequences between acceptor repeating units and wherein the smallest sequence has at least two donor repeating units, wherein said DA-CP is highly absorbent of visible light in a first redox state and appears black to the human eye as a thin film.

2. The DA-CP of claim 1, wherein said DA-CP comprises a soluble polymer.

3. The DA-CP of claim 1, wherein said DA-CP comprises a donor-acceptor electrochromic polymer (DA-ECP) wherein said DA-CP is highly absorbent of visible light in said first redox state and is highly transmissive to visible light in a second redox state.

4. The DA-CP of claim 1, wherein said DA-CP comprises a donor-acceptor electrochromic polymer (DA-ECP) wherein said DA-CP is highly absorbent of visible light in said first redox state and is colored in a second redox state.

5. The DA-CP of claim 1, wherein said acceptor repeating units are isolated from each other by a plurality of said donor repeating units.

6. The DA-CP of claim 1, wherein said acceptor repeating units comprise 2,1,3-benzothiadiazole (BTD) units.

7. The DA-CP of claim 1, wherein said acceptor repeating units comprise at least one derivative of thiadiazoloquinoxaline, quinoxaline, thienothiadiazol, thienopyrazine, pyrazinoquinoxaline, benzobisthiadiazole, thiadiazolothienopyrazine, or any combination thereof.

8. The DA-CP of claim 1, wherein said plurality of donor repeating units comprise at least one thiophene containing repeating unit.

9. The DA-CP of claim 1, wherein said plurality of donor repeating units comprise at least one fused-thiophene substituent.

10. A method of preparing a soluble donor-acceptor conjugated polymer (DA-CP) comprising the steps of:
providing a polymerization mixture comprising a plurality of at least one DA-oligomer comprising at least one interior acceptor repeating unit and a plurality of donor repeating units comprising 3,4-bis(alkoxy)thiophenes, bis-alkoxy substituted 3,4-alkylenedioxythiophenes, or any combination thereof, wherein at least one donor repeating unit resides at each termini of said DA-oligomer wherein said DA-oligomers comprise different pluralities of donor repeating units;
providing a plurality of at least one monomer comprising 3,4-bis(alkoxy)thiophenes, bis-alkoxy substituted 3,4-alkylenedioxythiophenes, or any combination thereof to said polymerization mixture when said DA-oligomer has monodispersed sequences of said donor repeating units or optionally providing said plurality of at least one monomer when said DA-oligomer has polydispersed sequences of said donor repeating units; and
polymerizing said polymerization mixture chemically, wherein said DA-CP comprises polydispersed sequences of donor repeating units between acceptor repeating units and is highly absorbent of visible light appearing black to the human eye as a thin film.

11. The method of claim 10, wherein a plurality of said acceptor repeating units are isolated from each other by a sequence comprising a plurality of donor repeating units in said DA-oligomer.

12. The method of claim 11, wherein said sequences are polydispersed, each of said sequences comprising a plurality of donor repeating units.

13. The method of claim 10, wherein said acceptor repeating units comprise 2,1,3-benzothiadiazole (BTD) units.

14. The method of claim 10, wherein said acceptor repeating units comprise at least one derivative of thiadiazoloquinoxaline, quinoxaline, thienothiadiazol, thienopyrazine, pyrazinoquinoxaline, benzobisthiadiazole, thiadiazolothienopyrazine, or any combination thereof.

15. The method of claim 10, wherein said DA-oligomer comprises at least one oligomer of the structure $H\text{-}(D)_m\text{-}A\text{-}(D)_m\text{-}A\text{-}(D)_{m'}\text{-}H$ and/or $H\text{-}(D_xD'_y)_m\text{-}A\text{-}(D_xD'_y)_{m'}\text{-}H$ wherein A is an acceptor unit, D and D' are different donor units, m and m' are independently 1 to 5 and are monodispersed or polydispersed, x is 0 to m, x' is 0 to m', y is m-x, y' is m'-x', and wherein either D or D' can be adjacent to A or a terminal unit.

16. The method of claim 15, wherein said DA-oligomer comprises at least one additional oligomer of the structure $H\text{-}(D_xD'_y)\text{-}A'\text{-}(D_xD'_{y'})\text{-}H$, $H\text{-}(D_xD'_y)\text{-}(A)_n\text{-}(D_xD'_{y'})\text{-}H$, $H\text{-}(D_xD'_y)(A')_n\text{-}(D_xD'_{y'})\text{-}H$, $H\text{-}(D_xD'_y)\text{-}(A_wA'_z)\text{-}(D_xD'_{y'})\text{-}H$, $[(D_xD'_y)\text{-}(A)]_n\text{-}(D_xD'_{y'})\text{-}H$, and $H\text{-}(D_xD'_y)\text{-}A\text{-}(D_xD'_{y'})\text{-}A'\text{-}(D_xD'_{y'})\text{-}A'\text{-}(D_xD'_{y''})\text{-}H$, wherein A and A' are different acceptor units, D and D' are different donor units, x is 0 to m, x' is 0 to m', y is m-x, y' is m'-x', w is 0 to n', z is n'-w, where m, m', m'', n and n' are independently 1 to 5 and are monodispersed or polydispersed and wherein either D or D' can be adjacent to A, A' and a terminal unit.

17. The method of claim 10 further comprising the step of providing to said polymerization mixture a plurality of at least one D-oligomer comprising donor units wherein said donor units are the same or different than said donor units of said DA-oligomer or said monomers.

* * * * *

UNITED STATES PATENT AND TRADEMARK OFFICE
CERTIFICATE OF CORRECTION

PATENT NO. : 8,404,800 B2  Page 1 of 1
APPLICATION NO. : 12/922908
DATED : March 26, 2013
INVENTOR(S) : Pierre Marc Beaujuge et al.

It is certified that error appears in the above-identified patent and that said Letters Patent is hereby corrected as shown below:

In the Specifications
Column 6,
Line 21, "Fe/Fc$^+$)" should read --Fc/Fc$^+$)--.

In the Claims
Column 10,
Lines 32-33, "H-(D)$_m$-A-(D)$_{m'}$-A-(D)$_{m'}$-H and/or" should read
--H-(D)$_m$-A-(D)$_{m'}$-H and/or--
Lines 41-42, ")— H, [(D$_x$D'$_y$)" should read --)-H, H-[(D$_x$D'$_y$)--.
Lines 42-43, ")-A-(D$_x$,D'$_{y'}$)-A'-(D$_{x'}$D'$_{y'}$)-A'-(D$_{x''}$D'$_{y''}$)-H," should read
--)-A-(D$_{x'}$D'$_{y'}$)-A'-(D$_{x''}$D'$_{y''}$)-H,--.

Signed and Sealed this
Thirteenth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,404,800 B2
APPLICATION NO. : 12/922908
DATED : March 26, 2013
INVENTOR(S) : Pierre Marc Beaujuge, John R. Reynolds and Stefan Martin Ellinger It is certified that error appears in the above-identified patent and that said Letters Patent is hereby corrected as shown below:

Title Page Item (75),
Inventors: "John J. Reynolds" should read --John R. Reynolds--.

Signed and Sealed this
Seventeenth Day of September, 2013

Teresa Stanek Rea
*Deputy Director of the United States Patent and Trademark Office*